March 13, 1934.    C. N. HARRUB    1,950,847
CHECK VALVE
Filed Sept. 16, 1932    2 Sheets-Sheet 1
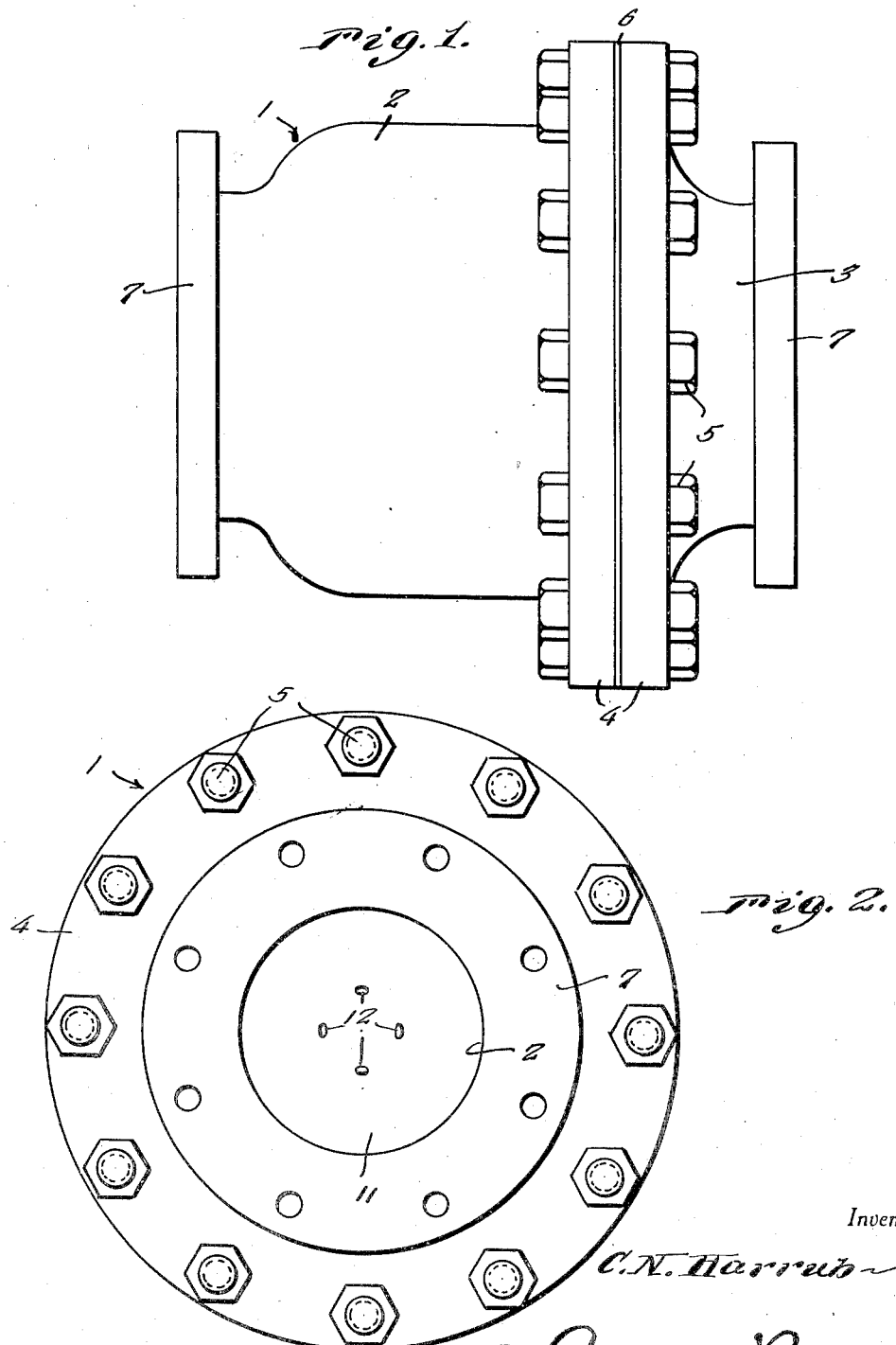
Inventor
C. N. Harrub
By Clarence A. O'Brien
Attorney March 13, 1934.                     C. N. HARRUB                     1,950,847
                                     CHECK VALVE
                                Filed Sept. 16, 1932          2 Sheets-Sheet 2
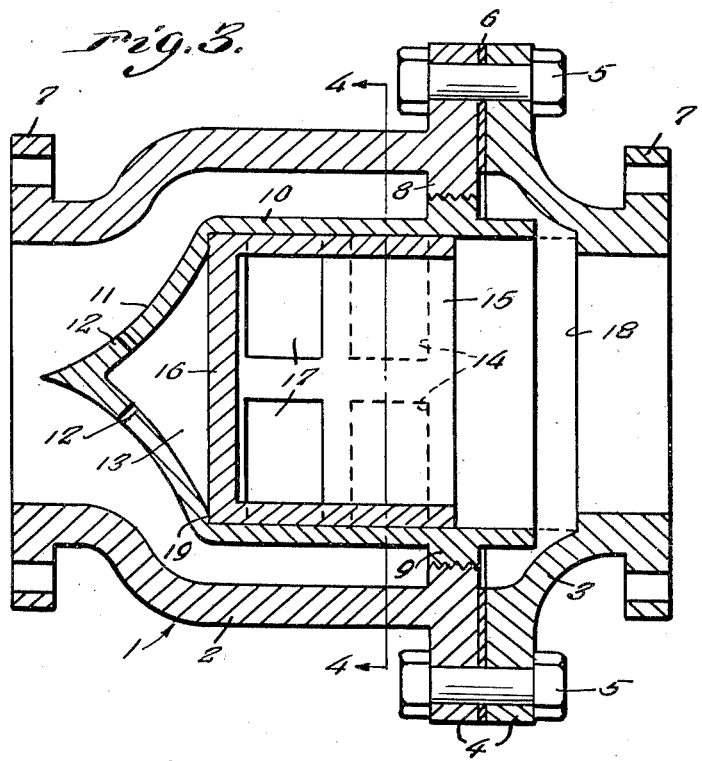
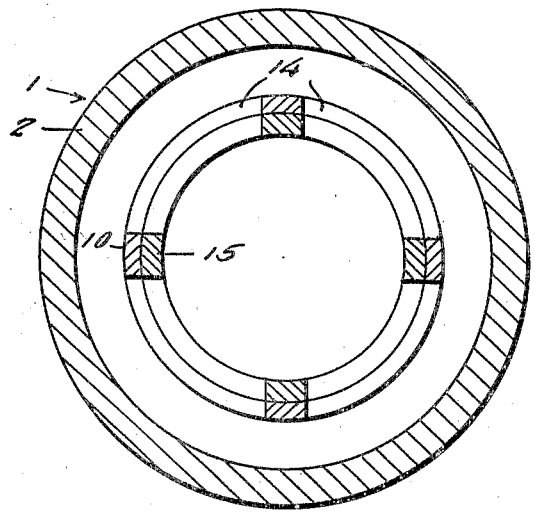
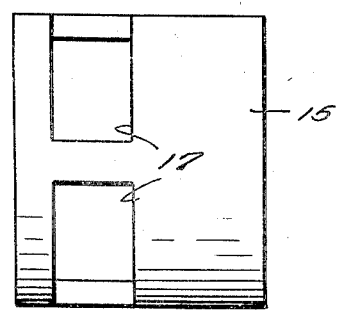
Inventor
C. N. Harrub
By Clarence A. O'Brien
Attorney Patented Mar. 13, 1934

1,950,847

UNITED STATES PATENT OFFICE 1,950,847

CHECK VALVE

Calvin N. Harrub, Nashville, Tenn.

Application September 16, 1932, Serial No. 633,527

4 Claims. (Cl. 251—127)

The present invention relates to new and useful improvements in check valves for use particularly in pipe lines carrying liquids under pressure and has for its prmary object to provide, in a manner as hereinafter set forth, a valve of this character embodying a novel construction, combination and arrangement of parts through the medium of which "hammering" will be prevented at all times.

Other objects of the invention are to provide a check valve of the character described which will be simple in construction, strong, durable, reliable in use, compact, and which may be manufactured and installed at low cost.

All of the foregoing and still further objects and advantages of the invention will become apparent from a study of the following specification, taken in connection with the accompanying drawings, wherein like characters of reference designate corresponding parts throughout the several views, and wherein:—

Figure 1 is a view in side elevation of a check valve constructed in accordance with the present invention.

Figure 2 is a view in elevation thereof, looking at the inlet end of the valve.

Figure 3 is a view in vertical longitudinal section through the valve.

Figure 4 is a view in vertical transverse section, taken substantially on the line 4—4 of Figure 3.

Figure 5 is a detail view in side elevation of the slidable valve member.

Referring now to the drawings in detail, it will be seen that the embodiment of the present invention which has been illustrated comprises a housing which is designated generally by the reference numeral 1, said housing including sections 2 and 3 having formed integrally therewith abutting, apertured, external flanges 4 which accommodate nut equipped bolts 5 through the medium of which said sections 2 and 3 are secured together. A gasket 6 of suitable material is interposed between the sections 2 and 3. The housing 1 is, of course, interposed in the pipe line and to this end said housing is provided with external apertured flanges 7 on the outer ends of the sections 2 and 3.

At its inner end, the section 2 of the housing 1 is further provided with an internal flange 8 having its inner periphery threaded for threadedly receiving an external flange 9 adjacent one end of a substantially cylindrical sleeve 10 which is thus mounted in the housing 1 in spaced, concentric relation to the walls of said housing. The end of the sleeve 10 which is adjacent the inlet end of the housing 1 is closed by a substantially conical wall 11 having ports 12 therein. Thus, a cushioning chamber 13 is provided in this end of the sleeve 10. The other end of the sleeve 10 is open and projects into the section 3 of the housing 1. Adjacent the flange 9 in the section 2 of the housing 1, the sleeve 10 is provided with a circumferentially extending series of openings or ports 14.

Mounted for reciprocation in the sleeve 10 is a substantially cup-shaped valve member 15 having that end which is adjacent the closed end 11 of the sleeve closed, as at 16. The other end of the valve member 15 is open. Adjacent its closed end, the valve member 15 has formed therein a circumferentially extending series of openings or ports 17 which are adapted to be brought into communication with the openings or ports 14.

The section 3 of the housing 1 has formed therein a seat or shoulder 18 with which the valve member 15 is engageable for limiting the movement of the said valve member toward opening position. The sleeve 10 has formed therein, substantially adjacent the point where said sleeve merges with the end wall 11, a seat or shoulder 19 with which the closed end of the valve member 15 is engageable for limiting the movement of the valve member toward closed position.

In use, the fluid enters the housing 1 through the outer end of the section 2 and builds up a pressure in said section 2. The fluid passes through the ports 12 into the chamber 13 and moves the valve member 15 toward the section 3 until said valve member is arrested by the stop shoulder 18, thus bringing the ports 17 into communication with the ports 14 of the sleeve 10 for the passage of the fluid through the valve. When the pressure in the pipe line is reversed, the valve member 15 is, of course, moved toward the closed end of the sleeve 10, thereby interrupting the communication between the ports 17 and 14. The fluid which is thus trapped in the closed end portion of the sleeve 10 can escape only slowly through the ports 12, thereby preventing rapid closing of the valve and consequent "hammering". Movement of the valve member 15 in this direction continues until arrested by engagement of said valve member with the stop shoulder or seat 19 in the sleeve 10.

It is believed that the many advantages of a check valve constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:—

1. A check valve comprising a housing open at its ends, a substantially cylindrical sleeve, having ports in its side walls, mounted in the housing in spaced, concentric relation thereto, a substantially conical end wall on one end of the sleeve having ports therein, the other end of the sleeve being open, and a substantially cylindrical, fluid-actuated valve member mounted for reciprocation in the sleeve, the end of the valve member which is adjacent the open end of the sleeve being open, the other end of the valve member being closed, said valve member having ports therein adjacent its closed end for communication with the first named ports.

2. A check valve comprising a housing open at its ends, a sleeve, having ports in its side walls, mounted longitudinally in the housing in spaced, concentric relation thereto, a substantially conical end wall on one end of the sleeve having ports therein, the other end of the sleeve being open, a valve member mounted for reciprocation in the sleeve and having ports therein for communication with the first named ports, and a stop shoulder in the housing adjacent the open end of the sleeve and engageable by the valve member for limiting the sliding movement of said valve member toward open position.

3. A check valve comprising a metallic housing including a pair of detachably connected sections, said sections being open at their outer ends, an internal, threaded flange in one of the sections, a sleeve threadedly mounted in the flange in spaced, concentric relation to the housing, a substantially conical end wall on one end of the sleeve having ports therein, the other end of the sleeve being open and projecting into the other section of the housing, said sleeve having ports in its side walls, a substantially cylindrical valve member mounted for reciprocation in the sleeve and having ports therein for communication with the second named ports, said valve member being closed at one end and open at its other end, a stop shoulder in the housing for limiting the movement of the valve member in one direction, and a stop shoulder in the sleeve for limiting the movement of the valve member in the other direction.

4. A check valve comprising a housing having aligned openings therein, a sleeve, having ports in its side walls, mounted longitudinally in the housing in spaced, concentric relation thereto, said sleeve being open at its forward end and closed at its rear end, the closed rear end of the sleeve having ports therein, a substantially cup-shaped fluid actuated valve member mounted for reciprocation in the sleeve, said valve member having ports in its side walls for communication with the first named ports, and an abutment in the housing in alignment with the sleeve and engageable with the open end of the valve member for limiting the movement of said valve member toward open position, said open end of the valve member being adjacent the open end of the sleeve, the closed end of said sleeve being substantially conical.

CALVIN N. HARRUB.